US008855046B2

(12) United States Patent
Jalloul et al.

(10) Patent No.: US 8,855,046 B2
(45) Date of Patent: Oct. 7, 2014

(54) METHOD AND SYSTEM FOR UPLINK COORDINATED RECEPTION IN ORTHOGONAL FREQUENCY DIVISION MULTIPLE ACCESS SYSTEMS

(75) Inventors: Louay Jalloul, Santa Clara, CA (US); Djordje Tujkovic, Santa Clara, CA (US); Vummintala Shashidhar, Santa Clara, CA (US); Bertrand Hochwald, Santa Clara, CA (US); Arogyaswami Paulraj, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 848 days.

(21) Appl. No.: 11/731,714

(22) Filed: Mar. 30, 2007

(65) Prior Publication Data

US 2008/0239938 A1 Oct. 2, 2008

Related U.S. Application Data

(60) Provisional application No. 60/787,392, filed on Mar. 29, 2006.

(51) Int. Cl.
H04W 4/00 (2009.01)
H04B 1/00 (2006.01)
H04W 72/08 (2009.01)
H04L 25/03 (2006.01)

(52) U.S. Cl.
CPC ... H04W 72/082 (2013.01); *H04L 2025/03426* (2013.01); *H04L 2025/03414* (2013.01)
USPC ........................... 370/328; 455/63.1; 455/423

(58) Field of Classification Search
USPC .......... 455/63.1, 296, 446–453, 423–425, 25, 455/562.1; 342/359, 367
See application file for complete search history.

(56) References Cited

U.S. PATENT DOCUMENTS

| 6,021,125 | A  | * | 2/2000 | Sakoda et al. | 370/345 |
| 6,891,897 | B1 | * | 5/2005 | Bevan et al. | 375/265 |
| 2002/0058513 | A1 | * | 5/2002 | Klein et al. | 455/447 |
| 2002/0126777 | A1 | * | 9/2002 | Kasapi et al. | 375/346 |
| 2002/0183095 | A1 | * | 12/2002 | Aoyama et al. | 455/561 |
| 2005/0096051 | A1 | * | 5/2005 | Lee et al. | 455/438 |
| 2006/0211441 | A1 | * | 9/2006 | Mese et al. | 455/522 |
| 2006/0234752 | A1 | * | 10/2006 | Mese et al. | 455/522 |
| 2006/0286995 | A1 | * | 12/2006 | Onggosanusi et al. | 455/522 |

* cited by examiner

Primary Examiner — Daniel Lai
(74) Attorney, Agent, or Firm — Sterne, Kessler, Goldstein & Fox P.L.L.C.

(57) ABSTRACT

Embodiments disclose a method of coordinating reception of uplink transmissions in order to reduce interference among transceivers in an OFDM wireless transmission system, or similar communication system, including a number of receivers communicating with one or more basestations in cell or sector arrangements. A basestation within each sector includes an uplink coordinated reception process that imposes coordinated reception techniques across sector or cell boundaries in order to improve uplink transmission quality between target terminals and basestations within each sector.

22 Claims, 6 Drawing Sheets

METHOD AND SYSTEM FOR UPLINK COORDINATED RECEPTION IN ORTHOGONAL FREQUENCY DIVISION MULTIPLE ACCESS SYSTEMS

CROSS-REFERENCE TO RELATED APPLICATIONS

The present application claims the benefit of the U.S. Provisional Application Ser. No. 60/787,392, entitled "Methods for Uplink Coordinated Reception in OFDMA Systems" and filed on Mar. 30, 2006.

TECHNICAL FIELD

The embodiments provided herein relate generally to communication systems, and more specifically to coordinating uplink reception across sector or cell boundaries in a wireless transmission system.

BACKGROUND

Various types of wireless communication systems involve signals from multiple users that are processed at a central location. In such systems, a basestation may handle traffic simultaneously from many different transceivers (terminals) that are operated by a multitude of different users. Such systems are often organized into geographic subdivisions, such as sectors so that the different signals can be effectively combined at a single basestation. A common example of such as system is a cellular phone network, in which a cellular basestation located in the center of a cell handles phone traffic for a number of users at the same time. In order to increase capacity, cells may be further subdivided into a number of sectors through sectorization techniques such as focused antenna arrays and/or time or frequency multiplexing methods. The communication paths in such wireless systems are usually separated into downlink (basestation-to-terminal) communications and uplink (terminal-to-basestation) communications.

In wireless communication systems, the quality of the signal depends in large part on the amount of noise measured at the receiver antenna of both the basestation and the terminals. In general, there are three main sources of noise at a receiver antenna: (1) ambient (non-system) noise or interference; (2) circuit noise, caused by the circuits of the receiver itself; and (3) system interference, which is introduced by transmitters or sources other than the target transceiver. The signal-to-interference-plus noise ratio (SINR) is a measure of the quality of the signal received by a terminal against the noise and interference in the system, and a higher SINR value indicates a higher quality of transmission in a wireless link. Thus, the amount of noise and system interference in the signal, as measured by the SINR value, determines the quality of the transmission link and generally dictates how much data can be carried on the communication line. The SINR level may differ depending on the location of a receiver within a cell or sector of the wireless system, and can also vary depending upon the composition or amount of noise versus interference, or vice-versa.

Users (terminals) in the uplink portion of a cellular, or similar system that are on or near the boundaries between cells or sectors usually have low SINR values because of the potentially strong interference from terminals of neighboring cells or sectors, or the large distance of the terminal from the basestation. As a result, these boundary-terminals often suffer from poor transmission quality, and may be forced to transmit at lower communication rates or move to more optimum locations within the cell or sector.

This effect is particularly pronounced in wireless transmission systems that utilize OFDM (Orthogonal Frequency Division Modulation) schemes or similar cellular systems, as the base stations are configured to simultaneously process communication traffic from multiple users at any one time. A multi-user version of OFDM is OFDMA (Orthogonal Frequency Division Multiple Access), which assigns subsets of subcarriers to individual users, thus allowing simultaneous transmission from several users. OFDMA systems may employ a "frequency reuse-one" technique, in which every cell and sector is free to utilize all of the subcarriers and symbols used in other cells and sectors. Such a system can have significant interference between sectors and cells, especially at the boundaries. Present interference mitigation techniques are generally ineffective at eliminating interference in terminals that are located at cell or sector boundaries. Such techniques may employ filtering or similar techniques to reduce interference, however, most present systems do not employ any coordination across sector or cell boundaries in order to improve uplink transmission quality between target terminals and basestations within each sector. Such coordination can often be advantageous in that it can allocate specific resources, such as power and time/frequency slots, that may be better utilized by a target terminal rather than an interfering terminal.

BRIEF DESCRIPTION OF THE DRAWINGS

Embodiments are illustrated by way of example and not limitation in the figures of the accompanying drawings, in which like references indicate similar elements and in which.

INCORPORATION BY REFERENCE

Each publication, patent, and/or patent application mentioned in this specification is herein incorporated by reference in its entirety to the same extent as if each individual publication and/or patent application was specifically and individually indicated to be incorporated by reference.

DETAILED DESCRIPTION

Embodiments disclose a method of coordinating reception of uplink transmissions in order to reduce cross-sector interference in an OFDM wireless transmission system, or similar communication system, including a number of receivers communicating with one or more basestations in cell or sector arrangements. A basestation within each sector includes an uplink coordinated reception process that implements coordinated reception techniques across sector or cell boundaries in order to improve uplink transmission quality between target terminals and basestations within each sector. The uplink coordinated reception process comprises three fundamental techniques. A first technique is a power distribution shift among target and interfering terminals, a second technique is a signal combination method, and the third technique is a time/frequency slot shifting method.

Figure 1:
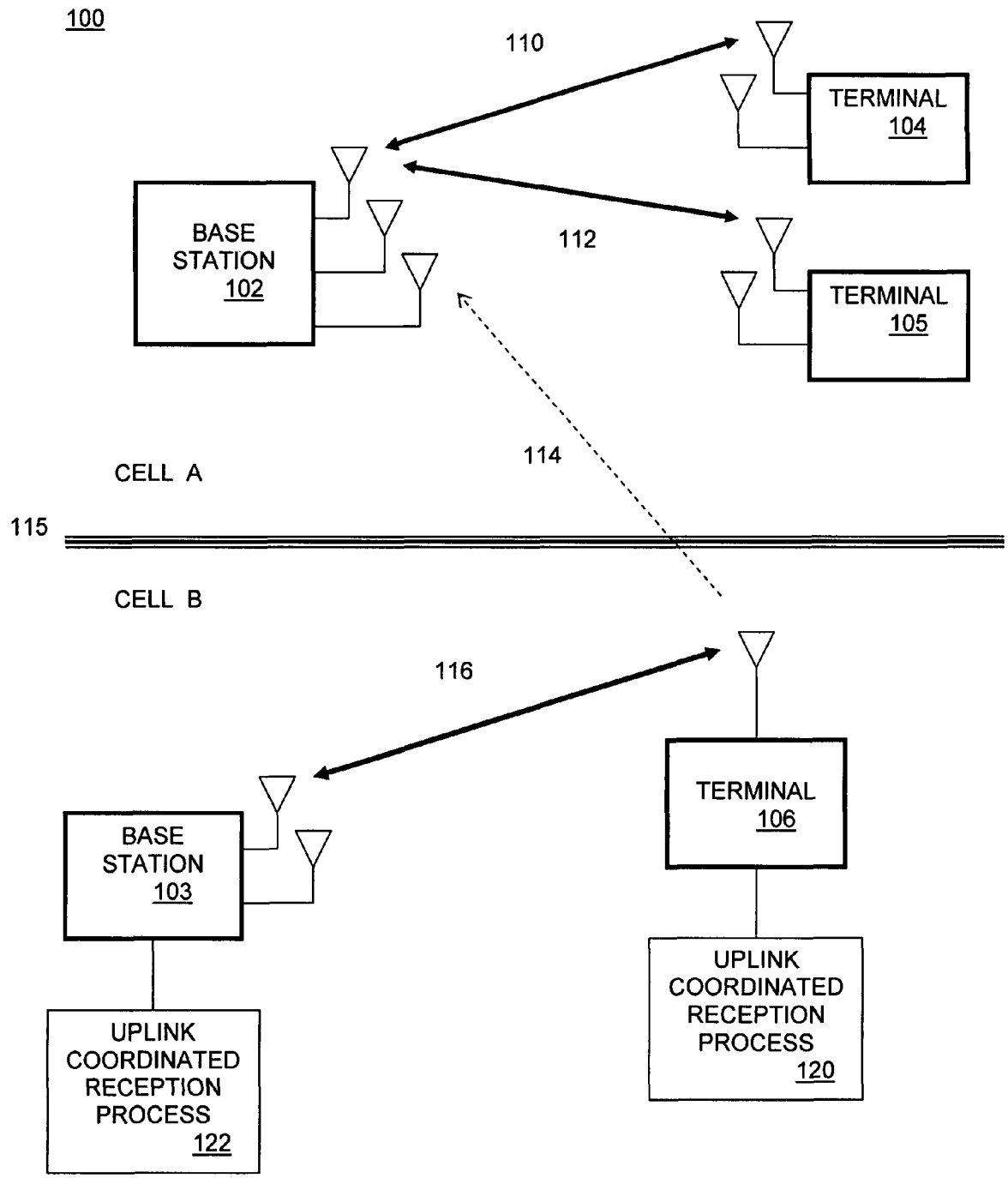
FIG. 1 illustrates a wireless system that includes an uplink coordinated reception process, under an embodiment.

FIG. 1 illustrates a wireless system that includes an uplink coordinated reception process, under an embodiment. In system 100, a first basestation or similar wireless transmitter 102, located in cell A, transmits and receives radio or similar wireless signals 110 and 112 from a plurality of transceiver terminals 104 and 105 that are within a cell or sector intended for reception of such desired signals. Likewise, a separate basestation 103, located in cell B, transmits and receives signals 116 from terminal 106. Basestations 102 and 103 are generally located in the center of their own cell or geographic location, such as cell areas A and B, and are configured to transmit and receive signals only for those terminals within their cell or location boundary 115. Under certain circumstances, however, uplink signals from a terminal may be received by basestation or terminal in another cell. Thus, as shown in FIG. 1, basestation 102 in cell A may pick up interference signals 114 that are transmitted from terminal 106 in cell B. Such interference is generally due to the fact that terminal 106 is at or near the cell boundary 115, and indeed may be closer to basestation 102 than to basestation 103. Likewise, downlink signals from basestation 102 may be inadvertently picked up by terminal 106. In general interference terms, if any terminal is near the cell boundary 115, the SINR value of that terminal due to the interference signals, such as signal 114 may be unacceptably high. For purposes of discussion, the terminals 104 and 105 that are within the intended range of transmissions from the basestation 102 are referred to as "target terminals," as distinct from unintended terminals, such as terminal 106, which are referred to as "interfering terminals."

The terminals illustrated in system 100 of FIG. 1 may be subscriber stations or any transceiver (transmitter/receiver) device that is capable of communicating over bi-directional links to one or more of the basestations. In one embodiment, each base station of the system includes or executes an uplink coordinated reception process 122 that mitigates the effect of unintended interference on boundary located terminals. Alternatively, each terminal can also include or execute a terminal-side uplink coordinated reception process 120. In general, the uplink coordinated reception process works with traffic on the uplink (terminal-to-basestation) links between the basestations and the terminals to mitigate the effect of any interference signals 114 generated by an interfering terminal 106

In one embodiment, system 100 of FIG. 1 utilizes data transmission based on frequency-division multiplexing (FDM), where each frequency sub-channel carries a separate stream of data. In a specific embodiment, OFDM (Orthogonal frequency-division multiplexing) is used. In OFDM, the sub-carrier frequencies are selected so that the modulated data streams are orthogonal to one another. This orthogonality allows for high spectral efficiency and simplifies transceiver design since separate filters are not needed for ach sub-channel. In general, OFDM is a modulation technique used in 802.11a WLAN, 802.16 and WiMAX technologies for transmitting large amounts of digital data over a radio wave. OFDM works by splitting the radio signal into multiple smaller sub-signals that are then transmitted simultaneously at different frequencies to the receiver. OFDM generally reduces the amount of crosstalk in signal transmissions.

In a further embodiment, Orthogonal Frequency Duplex Multiple Access (OFDMA) systems are used. In an OFDMA system, time and frequency are divided into sub-units called symbols (in time f) and subcarriers (in frequency k). The basestation typically assigns multiple time symbols and subcarriers to carry the data from the basestation to the terminal. Each terminal within a sector is usually assigned a distinct subset of available symbols and subcarriers, which is denoted a "slot." The number of subcarriers and symbols, and the level of modulation, which is usually a function of the SINR, determines the data rate to or from the terminal.

In one embodiment, network 100 includes a basestation 103 that includes or executes an uplink coordinated reception process 120. Each configured terminal, e.g., terminal 106 may also includes a client-side uplink coordinated reception process 122. In general, the uplink coordinated reception process 122 operates by dictating certain operational parameters of the target terminals within its sector, as well as of any potentially interfering terminals in other sectors in order to improve the SINR value of the target terminals. Thus, this process effectively coordinates operation of terminals across sector boundaries in order to improve reception within a particular sector.

Each of the basestation and terminals of FIG. 1 is typically a multiple input/multiple output (MIMO) transceiver system. Alternatively, one or more of the systems may be other types of systems, such as single input/single output (SISO) or combinations of MIMO and SISO systems.

Figure 2:
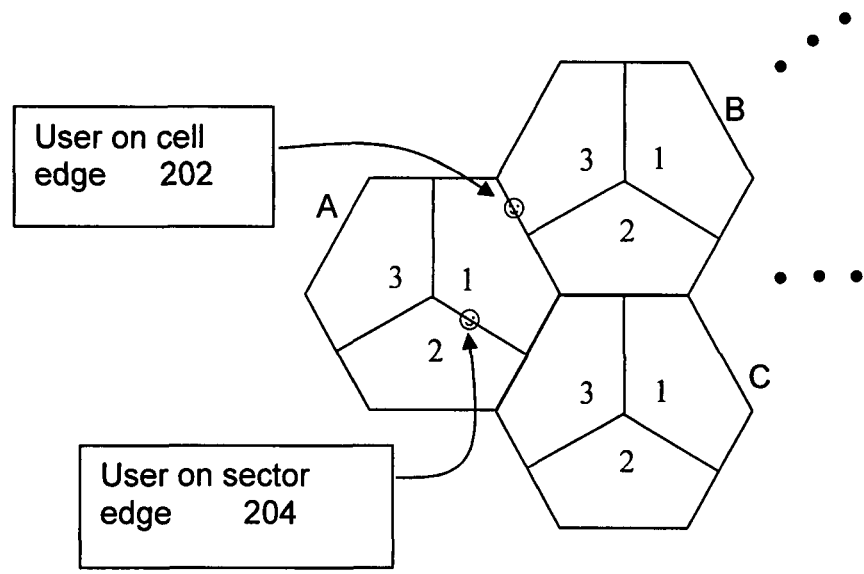
FIG. 2 illustrates a cell system that implements embodiments of an uplink coordinated reception process.

FIG. 2 illustrates a cell system that implements embodiments of an uplink coordinated reception process. The system of FIG. 2 illustrates three separate cells, denoted cells A, B, and C, with each cell divided into three equal sectors, denoted 1, 2, and 3. Although FIG. 2 illustrates a system that comprises three sectors within each cell, it should be noted that embodiments can be configured to work with any number of sectors, such as three, six, twelve, etc. In general, the number of sectors within each cell is defined by the system operator. In one embodiment, each cell is served by a single basestation that resides in the center of the cell. The basestation has a number of antenna elements that are focused on the individual sectors within the cell. Typically a basestation will have two antenna elements per sector, however, a greater number of antenna elements can be used.

Typically the edge of a cell represents a boundary where the SINR from a reference terminal at the serving basestation A is comparable with the level at a neighboring basestation, such as basestation B. The receiver at basestation B may receive signals from the terminal with even better SINR than at basestation A. In a similar fashion, the edge of a sector represents a boundary where the terminal transmission is received with potentially comparable SINRs in two or more sectors. Thus, a terminal being served in sector 1 may also be seen in sector 2 when it transmits an uplink communication. For the system of FIG. 1, each sector generally serves its own set of terminals, and the cell and sector boundaries indicate the cutoff between terminals of the different sectors. This may be accomplished by a sectorization method in which the certain antennas of a base station are pointed in a specific direction to illuminate only the terminals in a particular sector, to thereby isolate the terminals by geographic location. This sectorization allows signals to be sent over the same time and frequency slots to multiple terminals within the same cell, but in different sectors.

Alternatively, the basestation may utilize an omnidirectional antenna or antenna array, with sectorization provided by some form of time or frequency differentiation. In this embodiment, the interference mitigation process works to reduce interference among cells.

As illustrated in FIG. 2, user 202 is located on a boundary or edge between cell A and cell B, and user 204 is located on a boundary between sector 1 and sector 2 within cell A. Both of these terminals are generally more susceptible to interference from more than one source relative to terminals that are more centrally located within the sector or cell. In the context of an uplink transmission, a transmission from terminal 204 to its basestation within sector 2 may be received, at least in part, by receivers or the basestation in sector 1, if the terminal 204 is configured to transmit signals in the same time (t) and frequency (k) slot, $t_1k_1$ as the terminals in sector 1.

In one embodiment, the system of FIG. 2 is an OFDMA system, in which time and frequency are usually divided into sub-units called symbols (in time t) and subcarriers (in frequency k). The basestation within each sector typically assigns multiple time symbols and subcarriers to carry the data from the basestation to the terminals. Each terminal within a sector is usually assigned a distinct subset of the available symbols and subcarriers, which is denote as a "slot". The number of subcarriers, number of symbols, and the level of modulation (which is usually a function of the SINR) determines the data rate to or from the terminal. In a "frequency re-use one" system, every cell and sector is free to utilize all of the subcarriers and symbols without regard for the subcarriers and symbols used in other cells or sectors. Such a system can therefore have significant mutual interference between sectors and cells, especially at their boundaries, such as would be seen by or from users 202 and 204.

With reference to FIG. 2, terminal 204, being served by basestation A is on the sector 1-2 boundary and transmits signal s on subcarrier k and time t on sector 1, as follows:

$$s_{k,t}^{(1)} = u_{k,t}^{(1)}$$

where $u_{k,t}^{(1)}$ is a unit-energy data-symbol. A terminal on the same subcarrier k and time t in sector 2 transmits the signal:

$$s_{k,t}^{(2)} = u_{k,t}^{(2)}$$

where $u_{k,t}^{(2)}$ is its data-symbol. Sector 1 at time t and subcarrier k receives $$r_{k,t} = h_{k,t}u_{k,t}^{(1)} + g_{k,t}u_{k,t}^{(2)} + w_{k,t}$$

where the channel between the terminal in sector 1 and the receiver in sector 1 is $h_{k,t}$ and the channel between the terminal in sector 2 and the receiver in sector 1 is $g_{k,t}$. The receiver in sector 1 is interested in decoding $u_{k,t}^{(1)}$ but sees interference from $u_{k,t}^{(2)}$. In a similar fashion, the receiver in sector 2 may see interference from sectors 1 or 3 when trying to decode $u_{k,t}^{(2)}$.

In one embodiment, the uplink coordinated reception process organizes certain terminal into coordination groups. A coordination group is defined to be a set of one or more terminals, one per each sector or assigned to a single basestation, and which are chosen such that their slot-allocations are given special treatment to alleviate interference from each other at the basestation receiver. All terminals within a coordination group will generally use the same slot. Boundary terminals, which are usually the most distressed or susceptible to interference by the presence of other interfering terminals are typically members of this group, and any interfering terminals from other sectors or cells are also included. It should be noted that there may be interfering terminals within the same sector as the target terminal, however, it will be assumed that terminals within the same sector do not utilize the same slot, and therefore interference within a sector is virtually nonexistent.

Various different interference mitigation techniques may be employed by the uplink coordinated reception process through the control of one or more operating parameters related to the terminals of the coordinate group.

Power Distribution

In one embodiment, the uplink coordinated reception process 122 executed by a basestation for a particular coordination group implements a variable terminal power method, referred to as "power push-pull" in order to mitigate the effect of an interfering terminal in a different sector or cell on a target terminal within a sector or cell. In the power push-pull method, a low SINR (target) terminal from one sector is paired with one or more interfering terminals from another sector/cell in the slot. The transmit power of the target terminal is boosted, while the power of the interfering terminal(s) is simultaneously reduced through control from the basestation. The method effectively allows the basestation to have better SINR of the target terminal because of a "push" from the higher power and the "pull" from the lower interference. The interfering terminal may lose some SINR overhead, but generally it will still be able to maintain some desired minimum acceptable service. In one embodiment, a target SINR value for the target terminal relative to the interfering terminal is defined or determined. The power of the target terminal can be increased and/or the power of the interfering terminal can be decreased until the relative SINR values reach the target SINR value for the target terminal. This operation may be executed within the basestation, which then sends the appropriate control signals or instructions to the terminals causing them to either increase or decrease their operating power.

Figure 3:
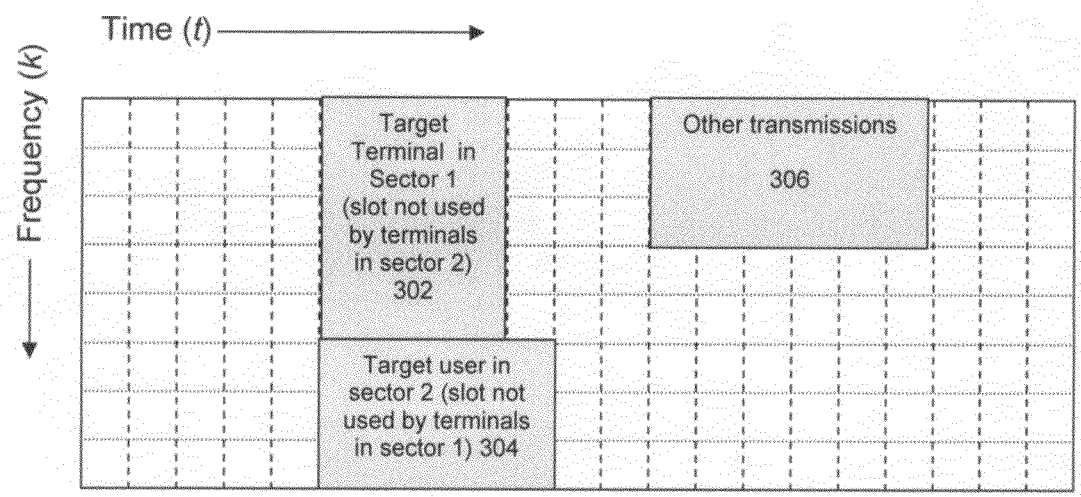
FIG. 3 illustrates an example time-frequency schedule for an interference prevention method, under an embodiment.

Another method of mitigating interference from a boundary terminal in an uplink transmission is a method referred to as "interference removal." In this method the uplink coordinated reception process only allows the terminal in the sector containing a target terminal to transmit in a defined slot. Terminals in other sectors or cells are shut out of transmitting in that slot. This is accomplished by either reducing their power to zero, or by changing the time and/or frequency of their transmission. This immediately improves the SINR at the basestation because significant interference from these other terminals is removed. FIG. 3 illustrates an example time-frequency schedule for an interference removal method, under an embodiment. FIG. 3 illustrates a time-frequency domain defined by a time (t) axis and a frequency (k) axis, and in which a slot is any specific unit at a particular time and frequency. As shown in FIG. 3, slot 302 illustrates a slot in which a target terminal operates in sector 1, and in which terminals in other sectors have been shut out. Likewise, slot 304 illustrates a slot in which a target terminal operates in sector 2, and in which terminals in other sectors have been shut out. In this embodiment, any sector 2 terminal trying to operate in slot 302 would have its power reduced to zero by the basestation to prevent interference with the target terminal, and likewise for a sector 1 terminal in slot 304. As an alternative to the power reduction method, any interfering terminal trying to operate in slot 302 or 304 could have either or both of its frequency and time assignment changed so that it operates in a different slot to the target terminal. Thus, as illustrated in FIG. 3, a sector 2 terminal could be moved from slot 302 to slot 306 in order not to interfere with the target terminal operating in slot 302.

In one embodiment of the interference removal technique may be used even in the case where there is more than one terminal within the same sector transmitting in the same slot. In this case, there may need to be some element of spatial separation among these terminals.

In one embodiment, the uplink coordinated reception process uses downlink signal strength information to identify target terminals that may be susceptible to interference in order to bolster the SINR values of these terminals. The basestation receives terminal reports of basestation signal strength on the downlink to these terminals and the SINR values observed from different basestations and sectors for the users on the uplink to determine suitable candidates for the coordination group. This method utilizes the fact that if a particular terminal has trouble receiving signals from the basestation on the downlink transmission due to its location, the basestation, in turn, will most likely have trouble receiving signals from that terminal on the uplink transmission. Any such terminal can be identified and then controlled by the basestation to have increased power or other measures to improve its SINR value.

Signal Combination

In certain circumstances more than one sector or basestation may receive an interference signal from the terminals in the coordination group. In this case, the uplink coordinated reception process includes a co-reception method that allows each sector/basestation to weight its reception by a scaling factor and combine the result with the reception of other sectors/basestations before making a decision on the received data. For example, the combined signal data may be used to boost or reduce the power to one or more terminals in the sectors to mitigate the effects of the interfering signal.

The scaling factors will depend generally on the relative signal strength of the terminals as received across the sectors or cells. One possible way to combine the received signals from two or more sectors (cells) is the Maximum Ratio Combining (MRC) method, which requires the basestation to weight (multiply) the incoming received signals by the conjugate of the channel or another function of the SINR or related metric and then sum the resulting multiplications. Another way to combine the received signals is to form separate log-likelihood ratios of the information bits at each basestation/sector and sum them for a final log-likelihood ratio. The log-likelihood ratios can be calculated using the SINR estimates. Other techniques, such as zero-forcing nulling, can also be used.

As an example, if an interference signal is received by the terminal in both sectors 1 and 2, the combined signal reception for the terminals in these sectors can be expressed in linear algebraic form of y=Hs+n, as follows:

$$y_1 = h_{11}s_1 + h_{12}s_{12} + n_1$$

$$y_2 = h_{21}s_1 + h_{22}s_2 + n_2$$

where s is the signal value, h is the channel between the terminal in sector 1 and the terminal in sector 2, and n is the noise figure for the terminals.

These equations generate the following matrices:

$$H = \begin{vmatrix} h_{11} h_{12} \\ h_{21} h_{22} \end{vmatrix}$$

$$S = \begin{vmatrix} s_1 \\ s_2 \end{vmatrix}$$

$$n = \begin{vmatrix} n_1 \\ n_2 \end{vmatrix}$$

The solution under the MRC method would be: $\hat{S}_{MRC} = H^*y$, and the solution under the zero-forcing nulling would be: $\hat{S} = H^{-1}y$. The technique of combining received signals in this manner can be used in any number of sectors or terminals per sector.

In one embodiment of the co-reception process, a joint detection technique is utilized. In this method, the reception of signals from out-of-sector or out-of-cell terminals is not treated as interference. Instead, the basestation jointly processes the signals from two or more terminals using simultaneous measurements across sectors or cells. As an example of this process, if a terminal in sector 2 at time t and subcarrier k receives the signal r:

$$r'_{k,t} = h'_{k,t} u_{k,t}^{(1)} + g'_{k,t} u_{k,t}^{(2)} + W'_{k,t}$$

where the channel between the terminal in sector 1 and receiver in sector 2 is $h'_{k,t}$ and the channel between the terminal in sector 2 and receiver in sector 2 is $g'_{k,t}$. This reception can be combined with the reception $r'_{k,t}$ to make a joint decision on $u_{k,t}^{(1)}$ and $u_{k,t}^{(2)}$.

In one embodiment, the co-reception method includes a process of aligning pseudo-random sequences. In this case, the coordination group maintains the same slots for multiple transmissions. Since sectors and cells are often identified and protected by unique pseudo-random bit sequences (PRBS), which may also determine the slot assignment, it can be beneficial to align the pseudo-random sequences for terminals in the coordination group.

The uplink coordinated reception process can also implement a forced handoff process. In this process, a terminal in one sector forced onto a second sector. Thus, although the terminal has not physically moved from one sector to another, the second sector is forced to accept the terminal. In this case a terminal has a preference for the sector that it would like to be served but the basestation overrides this preference based on interference and pseudo-random sequence requirements. In this way, the load of a terminal in a sector can be transferred to another sector but the processing sector can still include the original sector. Such a method constitutes a virtual physical location shift of a terminal.

Figure 4:
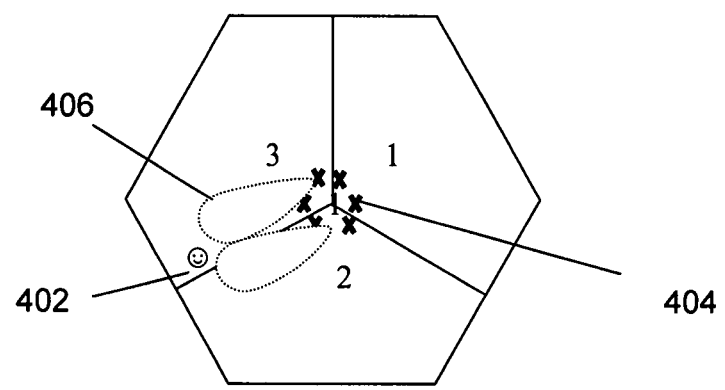
FIG. 4 illustrates the addition of beamforming techniques to aid the reception of a boundary terminal, under an embodiment.

In one embodiment, the wireless system utilizes beamforming techniques to focus antenna patterns on specific terminals in order to further augment the spatial isolation of the terminals. This beamforming technique can use multiple antennas from within a sector or cell, or across multiple sectors or cells participating in the co-reception. For example, in the power push-pull method, a receiver beam could be steered toward a target terminal in the served sector and away from the target terminal in the interfering sector. Similarly, in the co-reception case, the system could coordinate beams from two different sectors (or cells) to the target terminal. FIG. 4 illustrates the addition of beamforming techniques to aid the reception of a boundary terminal, under an embodiment. Each sector 1, 2, and 3 have a plurality of antennas 404 deployed by a base station at the center of the cell. One or more of the antenna of the array are configured to focus in a beamformed pattern 406. Thus, as shown in system 400, terminal 402 on the sector 2-3 boundary is illuminated by the focused beamformed pattern.

In many wireless transmission systems, uplink transmissions may include elements that do not include data. One example are pilot signals that are interspersed among the data symbols, and which do not themselves carry any data. Such non-data signals, such as beacons, can also create interference among boundary terminals. In one embodiment, the uplink coordinated reception process is applied to pilot subcarriers (from which the transmission channel is usually learned at the terminal) in the same way as it is applied to data subcarriers. This helps maximize the SINR on the pilots and enhances channel estimation accuracy.

Other non-data signals include ranging data. In general, OFDMA systems usually require some sort of ranging process where terminals that wish to enter a network establish their distance to a serving basestation. During the ranging process, the terminal is requested to align its timing with the other terminals in the same sector. The basestation allocates some time/frequency resource to ranging. Embodiments of the uplink coordinated reception process may be applied to ranging information supplied by a terminal. In this case, the signal component, s will be within the time/frequency allocation for the ranging signal.

Methods of the uplink coordinated reception process may be applied to sectors of the same cell or sectors of different cells. In sectors of different cells the coordinated reception may occur at the radio network controller.

Time/Frequency Shifting

Embodiments of the uplink coordinated reception process generally manipulate an operational parameter or characteristic of the terminals within a coordination group, such as operating power or basestation assignment. For wireless systems that utilize shared time/frequency slots, the coordinate reception process can also shift the slot assignments of the terminals in the coordination group in order to mitigate interference between the terminals.

For example, embodiments may be directed to specific aspects of the WiMAX 802.16 and related standards that utilize this slot shifting technique. The WiMAX standard, and other similar standards define "zones" where terminals are scheduled according to their requirements for uplink traffic. A WiMAX basestation may request that simultaneous uplink PUSC (Partial Usage of Sub-Channels) zones in multiple sectors or cells be created, to which a coordination group may be assigned. The uplink coordinated reception process may be implemented within such a zone. In a PUSC zone, the terminals hop among disjoint overlapping frequencies. In this case the basestation must keep track of which terminals in which sectors or cells are interfering with the basestation or any target terminals. One complication associated with the hopping process is that it is likely that interfering terminals that interfere on one OFDM symbol will not interfere on the next. This requires additional processing at the basestation. In order to simplify processing, a zone called the Band-AMC (adaptive channel and modulation) may be used.

For systems that involve frequency hopping the algebraic equations for the combined signal reception for two sectors, 1 and 2 become:

$$y_1^{t1k} = h_{11} s_1^{t1k} + h_{12} s_2^{t1k} + n_1^{t1k}$$

$$y_2^{t1k} = h_{21} s_1^{t1k} + h_{22} s_2^{t1k} + n_2^{t1k}$$

where the $t_1 k$ term denotes the frequency bin, k, at a particular time $t_1$. These equations generate the following matrices:

$$H = \begin{vmatrix} h_{11} h_{12} \\ h_{21} h_{22} \end{vmatrix}$$

$$S = \begin{vmatrix} s_1(t) \\ s_2(t) \end{vmatrix}$$

$$n = \begin{vmatrix} n_1(t) \\ n_2(t) \end{vmatrix}$$

where the solution is expressed as $Y_1[f(t)]$ and $Y_2[f(t)]$.

Figure 5:
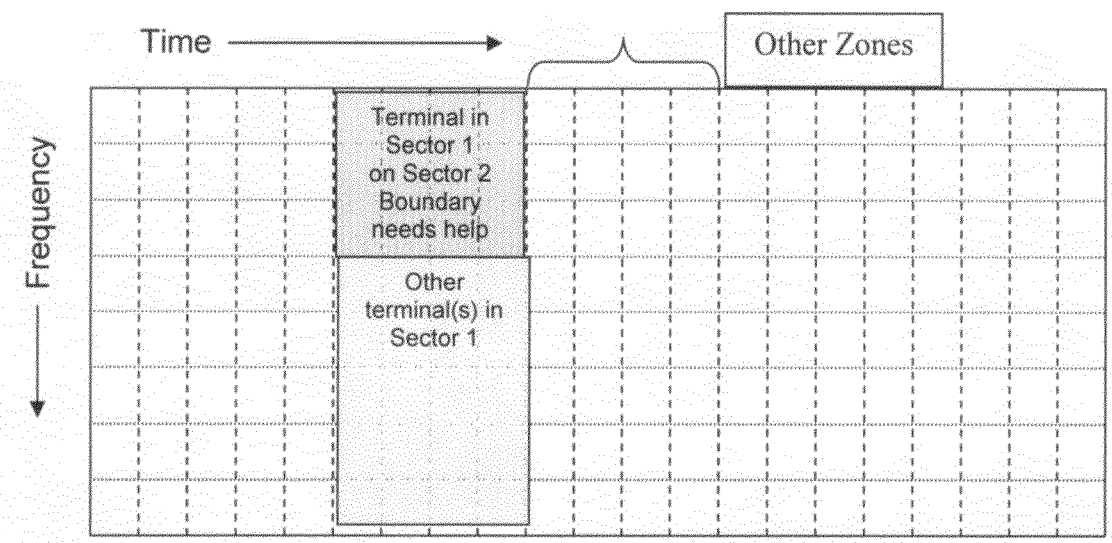
FIG. 5 illustrates the alignment of a Band-AMC zone in two sectors simultaneously, under an embodiment.
Figure 5:
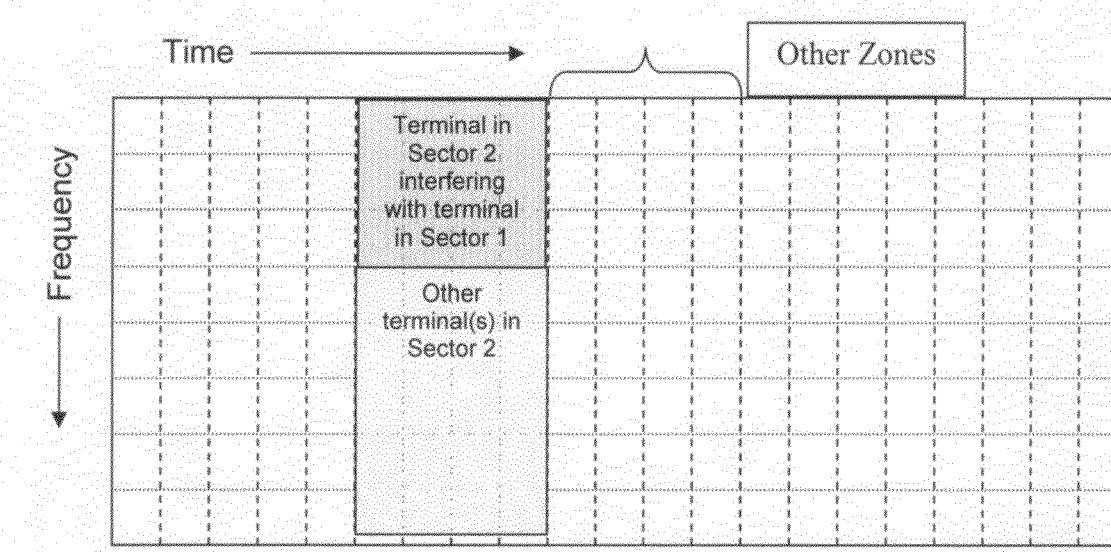

A WiMAX basestation may also request that simultaneous uplink Band-AMC Zones in multiple sectors or cells be created. In this case, a coordination group may be assigned to such zones, and the uplink coordination process may be implemented within such these zones. Band-AMC zones do not employ frequency hopping techniques, thus any interference between terminals across sectors or cells typically varies only slowly in time. FIG. 5 illustrates how a Band-AMC zone may be aligned in two sectors simultaneously, under an embodiment. As shown in FIG. 5, the sector 1 reception graph 502 illustrates a Band-AMC Zone 503 that is used as a coordinated reception zone for a sector 1 target terminal that is on the sector 2 border and is susceptible to interference from sector 2. Likewise, the sector 2 reception graph 504 illustrates a Band-AMC Zone 505 that is used as a coordinated reception zone for a sector 2 target terminal that is on the sector 1 border and is susceptible to interference from sector 1.

Although embodiments of uplink coordinated reception have been described with respect to OFDMA systems, it should be noted that these methods can also be applied to other systems, such as systems in which the underlying physical layer is a Fourier-transform spread single-carrier frequency-division multiple-access (SC-FDMA) system. Another possible standard is the 3GPP LTE (Long Term Evolution) standard developed by the Third Generation Partnership Project (3GPP).

Figure 6:
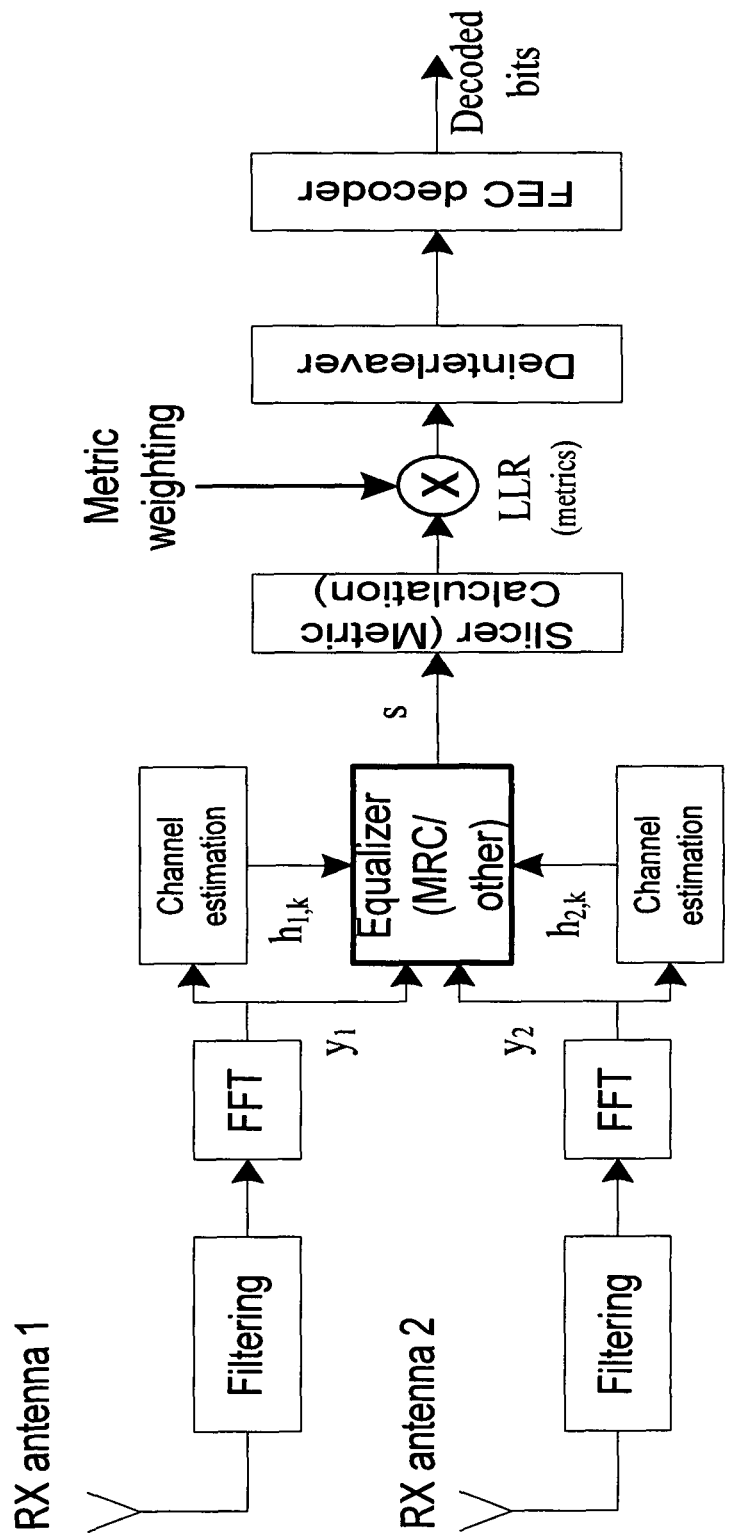
FIG. 6 is a block diagram of a receiver circuit that includes an uplink coordinated reception process, under an embodiment.

Embodiments of the noise and interference measurement process for uplink and downlink transmissions can be implemented on a variety of different types of basestations and receiver terminals. FIG. 6 is a receiver structure in which the noise and interference measuring methods of an embodiment can be used. FIG. 6 illustrates an embodiment of a receiver that can implement embodiments of a basestation-side or client-side noise and interference measurement process. Thus, receiver 600 can represent a receiver circuit within a terminal or basestation. Receiver 600 includes two receiver antennae 602 and 604, although more antennas are possible, each of which are processed through FFT (Fast Fourier Transform) circuits 606 and channel estimation 608 and equalization 610 circuits. An amount of preprocessing noise 605 and 607 are present at the outputs of the FFT circuits 606. Likewise, post-processing noise is present at the output of the equalizer circuit 610 before the signal is processed by subsequent digital processing circuitry, such as slicer 612, metric weighting circuit 614, de-interleaver 616, and decoder 618.

The uplink coordinated reception process 120 and/or 122 can be implemented as a circuitry incorporated into a receiver, such as receiver 600, or it may be a software or firmware program executed by a processor or similar logic device incorporated in the receiver, or a separate processing circuit coupled to the receiver. Alternatively, it may be implemented as a remote process executed by a processing circuit separate from the receiver, such as in a transmitter or other remote platform.

Embodiments may be directed to systems that utilize either Time Division Duplex (TDD) method or Frequency Division Duplex (FDD) method transmission, or any combination of TDD and FDD transmission.

Although embodiments have been described with reference to OFDM transmission systems, it should be noted that the methodology described herein can also be applied to other types of wireless or wired networks that centralized basestation control over a number of terminals that are divided geographically into different sectors, and that may or may not utilizes shared time/frequency slots.

Aspects of the uplink coordinated reception methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the uplink coordinated reception methods include: microcontrollers with memory (such as electronically erasable programmable read only memory (EEPROM)), embedded microprocessors, firmware, software, etc. Furthermore, aspects of the described methods may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that components of the systems and methods embodying the uplink coordinated reception methods disclosed herein may be described using computer aided design tools and/or expressed (or represented) as data and/or instructions embodied in various computer-readable media, in terms of their behavioral, functional, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described systems and methods may be processed by a processing entity (e.g., one or more processors) within the computer system in conjunction with execution of one or more other computer programs.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the uplink coordinated reception methods is not intended to be exhaustive or to limit the systems and methods to the precise form disclosed. While specific embodiments of, and examples for, the methods are described herein for illustrative purposes, various equivalent modifications are possible within the scope of other systems and methods, as those skilled in the relevant art will recognize. The teachings of the uplink coordinated reception methods provided herein can be applied to other processing systems and methods, not only for the systems and methods described above.

The elements and acts of the various embodiments described above can be combined to provide further embodiments. These and other changes can be made to the described methods in light of the above detailed description.

What is claimed is:

1. A method for reducing interference in a wireless communication system comprising:
    estimating signal-to-interference plus noise ratios (SINRs) for uplink transmissions from terminals in a first and second sector;
    based on the estimated SINRs, pairing a first terminal in the first sector with a second terminal in the second sector such that the first terminal and the second terminal transmit uplink during a same time and frequency slot, wherein uplink transmissions from the first terminal have a lower estimated SINR compared to uplink transmissions from the second terminal;
    after pairing the first terminal with the second terminal, increasing a transmit power of the first terminal in combination with decreasing a transmit power of the second terminal;
    receiving a first signal comprising the uplink transmissions from the first terminal and the uplink transmissions from the second terminal at the first sector;
    receiving a second signal comprising the uplink transmissions from the first terminal and the uplink transmissions from the second terminal at the second sector; and
    combining the first signal and the second signal, wherein the first signal and the second signal are combined using at least one of maximum ratio combining, likelihood ratios, and zero-forcing nulling.

2. The method of claim 1, further comprising:
    receiving the uplink transmissions from the first terminal and the uplink transmissions from the second terminal according to a time division duplex protocol.

3. The method of claim 1, wherein the wireless communication system is configured to operate according to at least one of an Institute of Electrical and Electronics Engineers (IEEE) 802.11 standard or an IEEE 801.16 standard.

4. The method of claim 1, wherein decreasing the transmit power of the second terminal comprises:
    decreasing the transmit power of the second terminal to zero.

5. The method of claim 1, further comprising:
    reassigning either the first terminal or the second terminal to a different sector.

6. The method of claim 1, wherein the uplink transmissions from the first terminal and the uplink transmissions from the second terminal are formatted in accordance with an orthogonal frequency division multiplexing (OFDM) scheme.

7. The method of claim 1, wherein the wireless communication system is a cellular based communication system that includes first antenna elements allocated to the first sector and second antenna elements allocated to the second sector.

8. The method of claim 7, further comprising:
forming focused antenna patterns using at least one of the first antenna elements and the second antenna elements.

9. The method of claim 1, wherein estimating the SINRs for uplink transmissions transmitted from the terminals in the first and second sectors comprises:
using signal strength values estimated by the terminals in the first and second sectors, wherein each of the signal strength values are associated with a strength of a downlink signal.

10. A non-transitory computer-readable medium having stored thereon computer executable instructions that, when executed by a computing device, cause the computing device to perform steps to reduce interference in a wireless communication system, the steps comprising:
estimating signal-to-interference plus noise ratios (SINRs) for uplink transmissions transmitted from terminals in a first and second sector;
based on the estimated SINRs, pairing a first terminal in the first sector with a second terminal in the second sector such that the first terminal and the second terminal transmit uplink during a same time and frequency slot, wherein uplink transmissions from the first terminal have a lower estimated SINR compared to uplink transmissions from the second terminal;
after pairing the first terminal with the second terminal, increasing a transmit power of the first terminal in combination with decreasing a transmit power of the second terminal;
receiving a first signal comprising the uplink transmissions from the first terminal and the uplink transmissions from the second terminal at the first sector;
receiving a second signal comprising the uplink transmissions from the first terminal and the uplink transmissions from the second terminal at the second sector; and
combining the first signal and the second signal, wherein the first signal and the second signal are combined using at least one of maximum ratio combining, likelihood ratios, and zero-forcing nulling.

11. The non-transitory computer-readable medium of claim 10, wherein the computer executable instructions further cause the computing device to perform the step of:
receiving the uplink transmissions from the first terminal and the uplink transmissions from the second terminal according to a time division duplex protocol.

12. The non-transitory computer-readable medium of claim 10, wherein the wireless communication system is configured to operate according to at least one of an Institute of Electrical and Electronics Engineers (IEEE) 802.11 standard or an IEEE 801.16 standard.

13. The non-transitory computer-readable medium of claim 10, wherein decreasing the transmit power of the second terminal comprises:
decreasing the transmit power of the second terminal to zero.

14. The non-transitory computer-readable medium of claim 10, wherein the computer executable instructions further cause the computing device to perform the step of:
reassigning either the first terminal or the second terminal to a different sector.

15. The non-transitory computer-readable medium of claim 10, wherein the uplink transmissions from the first terminal and the uplink transmissions from the second terminal are formatted in accordance with an orthogonal frequency division multiplexing (OFDM) scheme.

16. The non-transitory computer-readable medium of claim 10, wherein the wireless communication system is a cellular based communication system that includes first antenna elements allocated to the first sector and second antenna elements allocated to the second sector.

17. The non-transitory computer-readable medium of claim 10, wherein the computer executable instructions further cause the computing device to perform the step of:
forming focused antenna patterns using at least one of the first antenna elements and the second antenna elements.

18. The non-transitory computer-readable medium of claim 10, wherein estimating the SINRs for uplink transmissions transmitted from the terminals in the first and second sectors comprises:
using signal strength values estimated by the terminals in the first and second sectors, wherein each of the signal strength values are associated with a strength of a downlink signal.

19. A method for reducing interference in a wireless communication system comprising:
estimating signal-to-interference plus noise ratios (SINRs) for uplink transmissions from terminals in a first and second sector;
based on the estimated SINRs, pairing a first terminal in the first sector with a second terminal in the second sector such that the first terminal and the second terminal transmit uplink during a same time and frequency slot, wherein uplink transmissions from the first terminal have a lower estimated SINR compared to uplink transmissions from the second terminal;
after pairing the first terminal with the second terminal, increasing a transmit power of the first terminal while simultaneously decreasing a transmit power of the second terminal;
receiving a first signal comprising the uplink transmissions from the first terminal and the uplink transmissions from the second terminal at the first sector;
receiving a second signal comprising the uplink transmissions from the first terminal and the uplink transmissions from the second terminal at the second sector; and
combining the first signal and the second signal, wherein the first signal and the second sinal are combined using at least one of maximum ratio combining likelihood ratios, and zero-forcing nulling.

20. The method of claim 19, wherein the wireless communication system is a cellular based communication system that includes first antenna elements allocated to the first sector and second antenna elements allocated to the second sector.

21. The method of claim 20, further comprising:
forming focused antenna patterns using at least one of the first antenna elements and the second antenna elements.

22. The method of claim 19, wherein estimating the SINRs for uplink transmissions transmitted from the terminals in the first and second sectors comprises:
using signal strength values estimated by the terminals in the first and second sectors, wherein each of the signal strength values are associated with a strength of a downlink signal.

* * * * *